US006199801B1

(12) United States Patent
Wilke et al.

(10) Patent No.: US 6,199,801 B1
(45) Date of Patent: Mar. 13, 2001

(54) WHOLE-SPACECRAFT PASSIVE ISOLATION DEVICES

(75) Inventors: Paul S. Wilke, San Jose; Conor D. Johnson, Belmont, both of CA (US)

(73) Assignee: CSA Engineering, Inc., Mountain View, CA (US)

( * ) Notice: Subject to any disclaimer, the term of this patent is extended or adjusted under 35 U.S.C. 154(b) by 0 days.

(21) Appl. No.: 08/980,790

(22) Filed: Dec. 1, 1997

(51) Int. Cl.$^7$ ...................................................... B64G 1/38
(52) U.S. Cl. ........................ 244/170; 244/158 R; 244/131
(58) Field of Search ................................ 244/170, 158 R, 244/17.27, 131; 267/164, 160, 30, 136; 248/557, 609, 635, 638

(56) References Cited

U.S. PATENT DOCUMENTS

| | | |
|---|---|---|
| 2,557,610 | * 6/1951 | Meyers et al. . |
| 3,517,897 | 6/1970 | Wells . |
| 3,592,422 | * 7/1971 | Norman . |
| 3,663,002 | * 5/1972 | Gergle et al. . |
| 4,111,386 | * 9/1978 | Kenigsberg et al. . |
| 4,362,281 | * 12/1982 | Cresap et al. . |
| 4,682,744 | 7/1987 | Gounder . |
| 4,725,046 | * 2/1988 | Sugino . |
| 5,199,672 | * 4/1993 | King et al. . |
| 5,232,073 | * 8/1993 | Bronowicki et al. . |
| 5,244,170 | * 9/1993 | Shekher . |
| 5,310,276 | * 5/1994 | Bergers et al. . |
| 5,358,210 | * 10/1994 | Simon et al. . |
| 5,411,226 | * 5/1995 | Jones et al. . |
| 5,641,133 | * 6/1997 | Toossi . |

FOREIGN PATENT DOCUMENTS

822350  * 10/1959 (GB) ........................................ 267/30
945860  * 1/1964 (GB) ........................................ 267/30

OTHER PUBLICATIONS

Wilke et al, "Whole–Spacecraft Vibration Isolation for the Taurus–2/GFO Mission" Report number Sep. 2, 1997. CSA Engineering.*

Fosness, E. R. et al., "Launch Vibration Isolation System", ENG. Mechanics Conference, pp. 228–231 (1996).

Fosness, E.R. et al., "Passive Isolation Systems . . . ", Conf. on Space, pp.1176–1183 (1996).

Wilke, P. S. et al., "Payload Isolation System . . . ", SPIE Conf. (1997).

Wilke, P. S. et al., "Whole–Spacecraft Passive . . . ", as Forum, (1997).

* cited by examiner

Primary Examiner—Peter M. Poon
Assistant Examiner—Tran Dinh
(74) Attorney, Agent, or Firm—James Creighton Way; Meera P. Narasimhan

(57) ABSTRACT

Excitations from engines of the launch vehicles and the aerodynamics of flight produce large vibrations which are very detrimental to spacecraft during launch. Whole-spacecraft vibration isolation systems that greatly reduce the transmitted structure-borne vibrations to the spacecraft are disclosed. The disclosed devices, when combined together into an isolation system, provide vibration isolation for the complete spacecraft and are the only connection between the spacecraft and the launch vehicle. Devices that provide isolation in the axial (thrust) direction are disclosed. These devices consist of an arrangement of damped metallic flexures and machined springs, which provide relative flexibility in the desired direction. Passive damping is provided by compressing and shearing viscoelastic materials.

8 Claims, 4 Drawing Sheets

WHOLE-SPACECRAFT PASSIVE ISOLATION DEVICES

Figure 1:
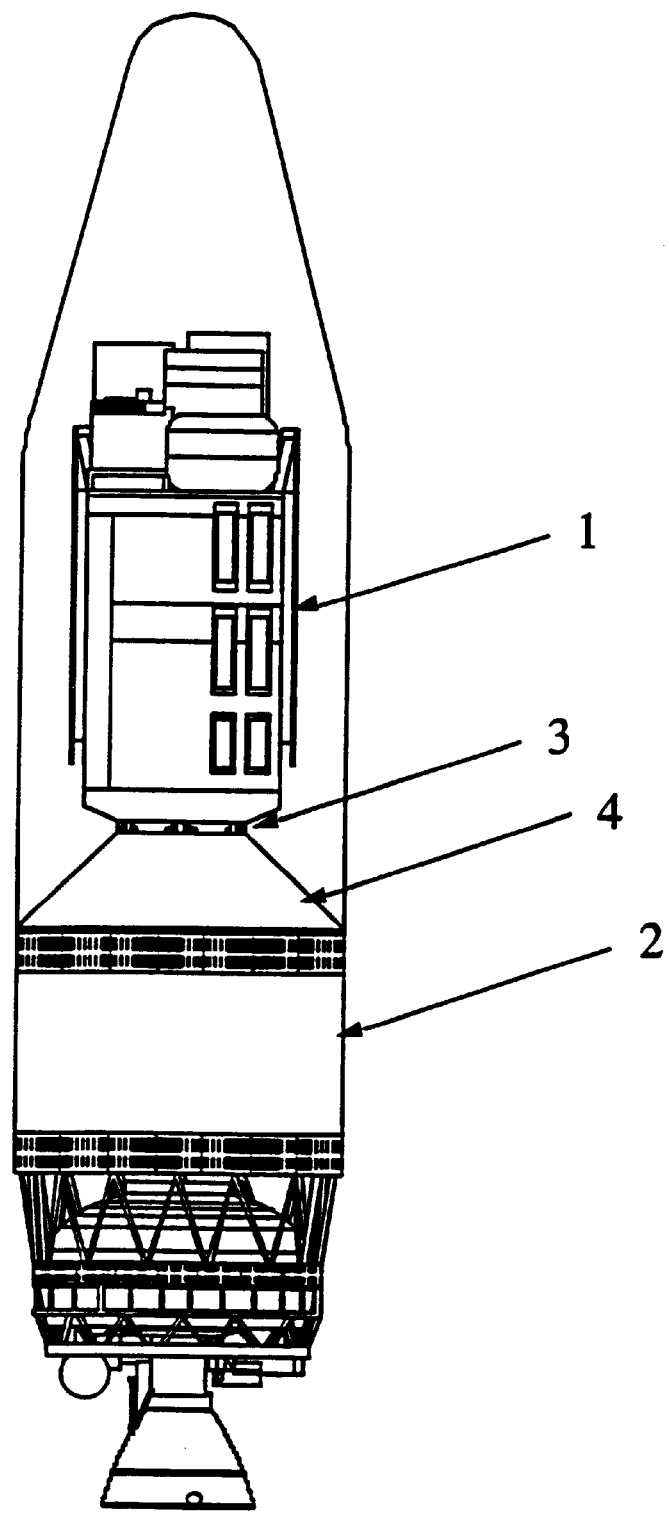
Figure 2:
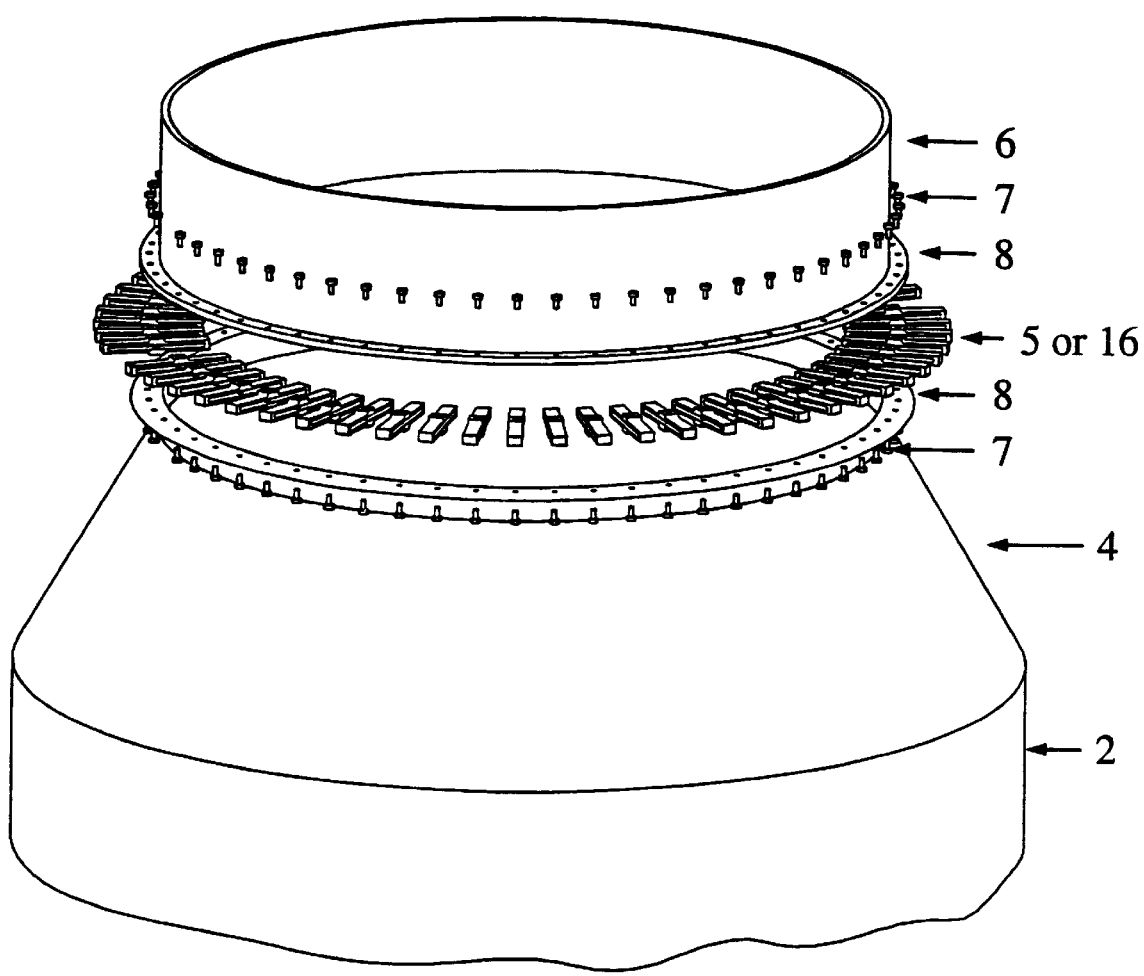
Figure 3:
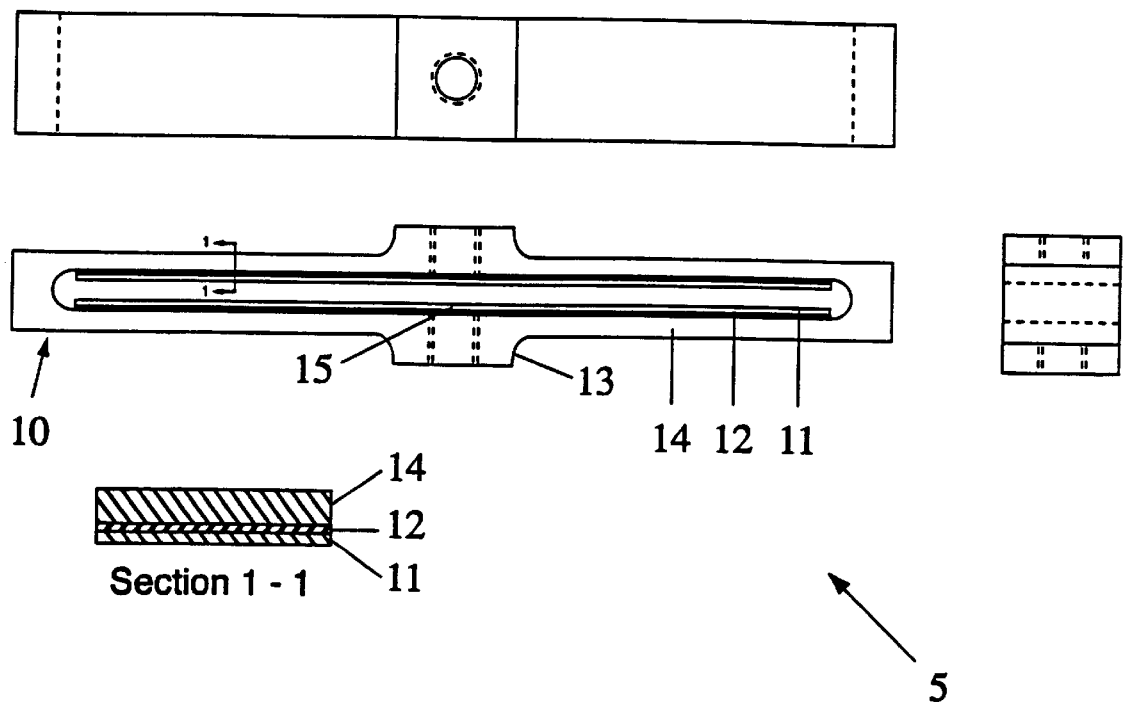
Figure 4:
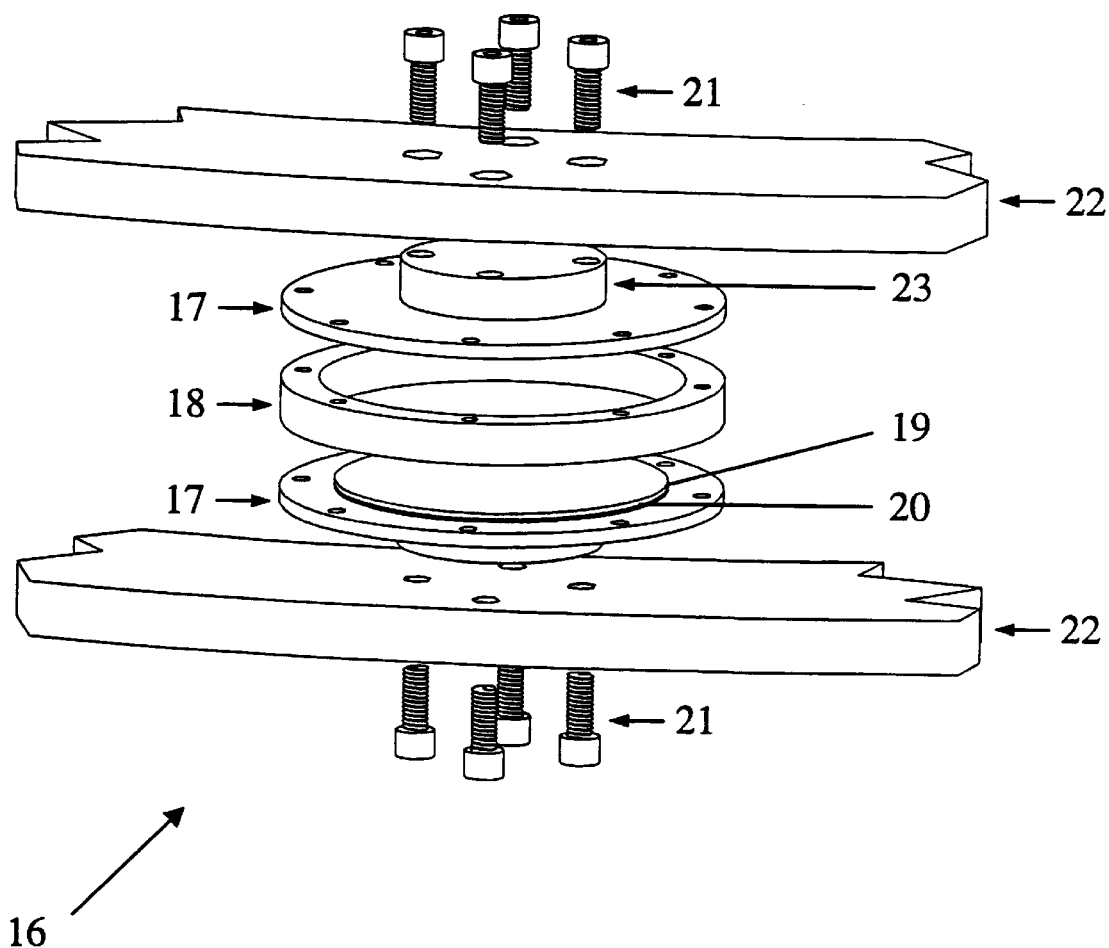

This invention was made with Government support under Contract F29601-96-C-0107 awarded by the Department of the Air Force. The Government has certain royalty-free rights in this invention.

BACKGROUND OF THE INVENTION

This invention relates to passive vibration isolation and more particularly to a means of reducing the vibrations transmitted to spacecraft from their launch vehicles during the launch process. The benefits include reduced structural weight and cost, as well as increased life and reliability, of the spacecraft and its components.

Historically, the connection between the spacecraft and the launch vehicle has been made with a very stiff spacecraft adapter. That is generally considered to be a "hard mount" and is extremely efficient at transmitting all structure-borne forces from the launch vehicle to the spacecraft over a very wide frequency band. A need exists for isolating the payload of a launch vehicle from structure-borne vibrations due to launch, maneuvering, thrust termination and staging, as well as periodic thrust oscillations, pyrotechnic separation systems and aerodynamic loading.

Vibration isolation systems work by connecting the isolated structure (payload) to the base structure by means of a resilient mount or mounts. All isolation systems are mounting systems. If the isolated payload is also mounted by other than isolation elements, then those elements would "short circuit" the isolation system, and thereby prevent isolation. The payload has certain mass properties (i.e. inertia) which tend to make it stand still in inertial space even during vibration of the base structure from which it is supported by the resilient mounts. The degree to which the payload vibration is less than that of the supporting or base structure (i.e., the level of vibration isolation) is determined by the properties of the resilient mounts, by the geometry of their mounting to the payload and base structure, and by the mass properties of the payload. The resilient mounts must have low relative stiffness as compared to the base and payload, and they also must have some degree of structural damping. The stiffness of the resilient mounts is tuned so that the frequency of vibration of the supported payload on the resilient mounts is a specified value, i.e. the isolation frequency, which results in the payload being effectively isolated from dynamic loads of frequencies higher than the isolation frequency. Damping is required in the resilient mounts so to reduce the amplitude of response of the payload at the isolation frequency when the system is under external excitation at the isolation frequency. The resilient mounts must also allow sufficient relative motion between the vibrating base structure and the payload, which is referred to as the "rattle space."

Because the spacecraft is a major structural component of the launch vehicle/spacecraft dynamic system, variations in the isolation frequencies greatly effect the dynamics of the launch vehicle/spacecraft system. Any unpredicted changes in the dynamics can have an adverse effect on the control system of the launch vehicle and cause instability and thereby loss of the mission. Therefore, the stiffness properties of the isolation system must be well predicted and accounted for for the duration of the flight. The simplest and most effective way of achieving this predictable isolation system performance is by having a completely linear isolation system under all load cases, including launch vehicle acceleration loads from −2g's to +6g's. Resilient mounts commonly use a soft, non-linear material, such as an elastomeric, as their stiffness component. However, because of their non-linearity, elastomerics (rubbers, etc.) exhibit different stiffness under various loads, temperatures, and frequencies, resulting in complexity and unpredictability in performance, and therefore they cannot effectively be used as the stiffness component of a Whole Spacecraft Vibration Isolation System. Also, under very high static loads, elastomerics creep (deflect as a function of time), and this cannot be tolerated. The use of elastomeric material as the stiffness component has been due to its heretofore advantage in tolerating strains up to 50%, which has allowed the elastomeric isolation mount to provide the necessary rattle space.

Owners of spacecraft that cost tens to hundreds of millions of dollars demand a high strength, high fatigue-life connection between the spacecraft and the launch vehicle. This connection must provide a fail-safe connection; must be able to handle, without stress failure, the deflections due to the sum of the quasi-static acceleration loads of the spacecraft due to maneuvering and other vehicle loading events, and the dynamic loads of the isolation system; must be completely linear in all deflection regions (both tension and compression); and must be of minimal height (reducing payload volume) and minimal weight (reducing overall payload weight). The isolation system must also not introduce collateral problems with the launch, such as low frequency modes, interaction with the launch vehicle control system, or reduction of payload-fairing clearance. The isolation system must be easily tunable for different combinations of launch vehicles and spacecraft, and readily employable in existing spacecraft because flight heritage is important.

Whole-Spacecraft vibration isolation design has eluded previous attempts. The disclosed invention, which is elegant and simple, satisfies all of these requirements and has been proven with actual flight usage.

SUMMARY OF THE INVENTION

The invention described within is an axial vibration isolation device effective for implementing a whole-spacecraft passive isolation system. A whole-spacecraft passive isolation system, to be effective and practical, must provide substantial isolation of the payload spacecraft from high frequency dynamic loads while simultaneously supporting the spacecraft under high G quasi-static acceleration loads with minimal movement of the payload spacecraft relative to the launch vehicle structure. The device described does these things and provides substantial improvements in dynamic load isolation and fatigue-life performance over other types of isolation flexures, and additionally the device provides a linear load-vs.-deflection behavior, which is not present in any other flexure suitable for vibration load isolation. The linearity of the device provides for a much simpler analysis and design sizing process than for those which have non-linear load-vs.-deflection behavior. The device is also very compactly configured so that it may be simply and straightforwardly employed in presently fabricated hard-mount spacecraft support structures.

The flexure device disclosed achieves these qualities and improvements over other vibration isolation devices by separating the stiffness and damping determining features in a compact form. Other vibration isolation devices, to remain simple and compact, achieve vibration isolation and damping by passing the load through a viscoelastic or elastomeric material. This creates an inherently non-linear type of isolator because of the non-linear characteristic of the VEM. Passing the load through the VEM also results in a lower fatigue-life flexure because of the lower strength performance of the VEM relative to commonly used high strength materials such as titanium and high strength steels.

The device disclosed gains the advantage of linear behavior and long fatigue-life by passing the load through high strength, linear elastic material over the complete length of the flexure's load path. The required damping of the isolation device is gained by applying a VEM layer in a relatively minor and parallel load path sense. The common and theoretical approach to achieving this would be to have a separate spring and dashpot arrangement, where the dashpot would be mounted in parallel to a portion of the spring system, but this would be too bulky and heavy to be practical for use in whole-spacecraft isolation.

The cost benefits of an isolation system are due to the reduced environments requiring less qualification testing and at lower levels. Also, fewer analysis cycles are required. The weight benefits include reduced structural mass of secondary (and to a lesser extent, primary) structures. The savings can be turned into attitude control fuel; the item that sets the life of a large number of communication satellites. The benefits of reduced vibration loads will also increase the reliability of spacecraft components and allow more use of commercial off-the-shelf components, which are significantly less expensive than new custom components.

Designing spacecraft to higher loads results in more complicated secondary structures (supports, brackets, etc.), requiring a higher part count and more weight than is required for designing to lower loads. Use of whole-spacecraft-isolation will reduce the part count, thereby leading to a similar reduction in costs associated with designing, tracking and quality assurance.

Whole-spacecraft vibration isolation systems can greatly reduce the structure-borne vibrations on spacecraft (space vehicles, satellites) during launch. The excitations from the engines of the launch vehicles and the aerodynamics of flight produce vibrations which are very detrimental to spacecraft. In the past, the connection between the spacecraft and the launch vehicle has been made with a very stiff spacecraft adapter. This is generally considered to be a "hard mount" and is extremely efficient at transmitting all structure-borne forces from the launch vehicle to the spacecraft over a very wide frequency band. The whole-spacecraft isolation system replaces this hard mount with a system which provides a much softer ride for the spacecraft.

Providing a spacecraft a softer ride during the launch allows mission performance rather than launch survivability to be the controlling factor in spacecraft and component structural design. As the isolation system provides greatly reduced dynamic loads on the spacecraft and its components, structures can be light-weight, thereby providing a higher weight for payloads or on-orbit fuel. Since the dynamic loads will also be greatly reduced on the components in the spacecraft (such as solar arrays, instruments, control-moment gyros, etc.), significant engineering and testing time and money will be saved.

The whole-spacecraft isolation system provides the only structural connection between the spacecraft and the launch vehicle. It must therefore be capable of handling the high launch loads while providing a high degree of reliability. Whole-spacecraft isolation is a challenging problem because, without careful design, it can introduce problems in other areas. For example, most spacecraft are cantilevered to their launch vehicle, being attached only at their base at either three or four discrete points, or by a circular band clamp on a separation ring. Reduction of the axial attachment stiffness may introduce low-frequency spacecraft rocking (pitch & yaw) modes and large lateral displacements at the upper end of the spacecraft. That is generally undesirable because it may cause guidance control system instabilities or the spacecraft may hit the fairing. Therefore, whole spacecraft isolation systems are designed from a system-level point of view, accounting for the coupled dynamics of two very flexible bodies which are now connected with a flexible interface (the isolation system) as opposed to a hard mount. Indeed, the challenge is to determine exactly where to insert the new dynamics introduced by the isolation system within the sea of structural dynamics already present and to develop hardware that implement the needed dynamics.

Passive isolation systems for vibration (mechanical) isolation of whole spacecraft from the launch vehicle to reduce dynamic loading on the spacecraft during launch may be implemented in one of several configurations:

1) Axial (thrust direction) isolation provided by a damped flexure system;
2) Lateral isolation system provided by a damped flexure or flexure with an auxiliary damping device; or
3) Six degree of freedom isolation provided by a combination axial and lateral device.

Advantages for the disclosed implementations include that the system is passive (no electronics or controls required), it is easy to implement in a variety of existing spacecraft adapters, and it is relatively lightweight.

Solid-fueled launch vehicles have much to gain from the use of an axial isolation system having its isolation frequency tuned at 30 Hz or higher, as determined by system analysis. Those vehicles typically generate dynamic loads in the axial direction that far exceed any lateral loads. Those axial loads are the design driver for attached spacecraft.

A preferred embodiment of an axial isolation system consists of a set of isolator elements, preferably damped metallic flexures, that solely provide the mechanical connection of the spacecraft to the launch vehicle. Those isolators introduce compliance, or "soft springs", in the axial direction, but are relatively stiff in the lateral directions. Those axial isolators may be incorporated by removing all existing connectors, such as bolts, at a field joint in the existing spacecraft adapter and inserting anywhere from b 3to 120 axial isolator elements in place of the fasteners or connectors, such as bolts. The axial isolator element flexure design may have one of several forms depending on the particular spacecraft/launch vehicle combination.

One preferred form is a dual-beam flexure with a constrained layer damping treatment on each beam. The geometry of the dual-beam flexure (length, thickness, width) may be sized to properly tune the axial isolation frequency of the whole-spacecraft isolator, as needed. Titanium is typically the optimum material for those beams because it has a very high strength to weight ratio. Those flexures must have high strength because they carry very large dynamic and static loads. If weight is not an issue, then stainless steel is another good high-strength choice, which may be less expensive. The constrained layer damping treatment consists of a layer of viscoelastic material (VEM) attached to the inner surface of each beam in the dual-beam flexure. The VEM is selected from commercially available materials. The VEM is then "constrained" by attaching a thin metallic or composite layer to its exposed surface. The material for this constraining layer may be chosen to be the same as that of the dual-beam flexure.

Another preferred form for the isolator element design consists of a dual-disk flexure arrangement with a constrained layer damping treatment on the inner surface of each disk. That design is similar to the dual-beam design except that it is axisymmetric, thereby providing equal stiffness in both lateral directions. Choices for materials and VEM are governed by the same reasoning as for the dual-beam flexure design.

Liquid-fueled launch vehicles will benefit from the use of a lateral isolation system having its isolation frequency tuned at 12 Hz or higher, as determined by system analysis. Those vehicles generate dynamic loads in the lateral direction that are often the design driver for attached spacecraft, while dynamic axial loads may not be nearly as severe as they are on solid-fueled vehicles.

We claim:

1. A vibration isolation device comprising an isolation element of high strength material comprising first and second parallel flexures of high strength material, a high strength attachment connected between the first and second parallel flexures, wherein the first flexure is spaced a controlled distance from the second flexure by the attachment between the first and second flexures, such that the attachment supports the flexures at locations at or near extremities of the flexures, thus forming a continuous load path of high strength material through the flexures and the attachment; a viscoelastic material (VEM) attached to one or more surfaces of one or both of the flexures; a stiff constraining material attached to a surface of the viscoelastic material; and mounts connected to the flexures remote from the attachment for mounting the isolation element.

2. The device of claim 1, wherein the flexures are beams of rectangular cross section, wherein the attachment comprises contiguous ends of the beams for connecting the beams to each other and wherein the beams and the contiguous ends are constructed by machining the beams and the contiguous ends from a single block of high strength material.

3. The device of claim 1, wherein the mounts further comprise bosses placed at centers of the beams such that the bosses are coaxial.

4. The device of claim 3, wherein the viscoelastic material comprises a viscoelastic layer attached to each of the beams, and wherein the stiff constraining material comprises a stiff constraining layer attached to each viscoelastic layer.

5. The device of claim 1, wherein the flexures are high strength spaced circular disks, wherein the attachment comprises a high strength annular ring and wherein the disks are connected to one another along their peripheries through the annular ring, for forming the continuous load path of high strength material through the disks and the annular ring.

6. The device of claim 1, wherein plural isolation elements of claim 1 comprise a whole-spacecraft passive vibration isolation apparatus for mounting in plural mounting locations between a spacecraft and a launch vehicle, wherein each isolation element is inserted in one of the mounting locations between the spacecraft and the launch vehicle for forming a support structure such that one spacecraft mounting location utilizes one of the vibration isolation elements.

7. The apparatus of claim 6, further comprising a spacecraft-to-launch vehicle flanged connection structure, wherein the mounting locations are existing mounting bolt holes on the flanged spacecraft-to-launch vehicle flanged connection structure.

8. A vibration isolation device comprising an isolation element of high strength material comprising first and second parallel flexures of high strength material, a high strength attachment connected between the first and second parallel flexures, wherein the first flexure is spaced a controlled distance from the second flexure by the attachment between the first and second flexures, such that the attachment supports the flexures at or near extremities of the flexures, thus forming a continuous load path of high strength material through the flexures and the attachment, and mounts connected to the flexures remote from the attachment for mounting the isolation element.

* * * * *